United States Patent
Heinrichs et al.

(12) 
(10) Patent No.: US 6,220,570 B1
(45) Date of Patent: Apr. 24, 2001

(54) PLUG-IN CONNECTION WITH LEAKAGE PROTECTION

(75) Inventors: Gundolf Heinrichs, Wipperfürth; Wolfgang Offenloch, Pleidelsheim, both of (DE)

(73) Assignee: Armaturenfabrik Hermann Voss GmbH & Co. (DE)

( * ) Notice: Subject to any disclaimer, the term of this patent is extended or adjusted under 35 U.S.C. 154(b) by 0 days.

(21) Appl. No.: 09/588,480

(22) Filed: Jun. 6, 2000

Related U.S. Application Data

(62) Division of application No. 09/059,982, filed on Apr. 14, 1998, now Pat. No. 6,089,540.

(51) Int. Cl.⁷ .................................................. F16L 37/28
(52) U.S. Cl. ...................................... 251/149.6; 251/149.1
(58) Field of Search ............................... 251/149.6, 149.1

(56) References Cited

U.S. PATENT DOCUMENTS 3,715,099 * 2/1973 Shendure ........................... 251/149.6
5,586,748 * 12/1996 Kish .................................. 251/149.8

* cited by examiner

*Primary Examiner*—A. Michael Chambers
(74) *Attorney, Agent, or Firm*—Harness, Dickey & Pierce, P.L.C.

(57) ABSTRACT

A plug-in connection for connecting a plug-in part especially one formed by one end of a pipe line consisting of a receiving housing with a plug-in opening for the plug-in part, a circumferential seal for sealing a circular gap between the receiving housing and the inserted plug-in part as well as a valve element, which, when it is disconnected, automatically closes the receiving housing in order to provide run-out protection and which valve element, when it is inserted, is to be opened by means of the plug-in part. The valve element in order to close the receiving housing directly engages the same circumferential seal, which seals the plug-in part.

1 Claim, 2 Drawing Sheets

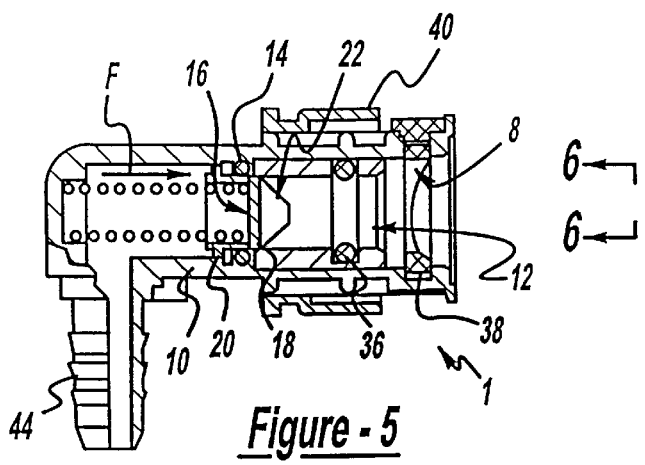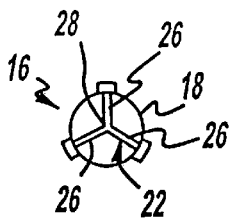
*Figure - 5*
*Figure - 6*
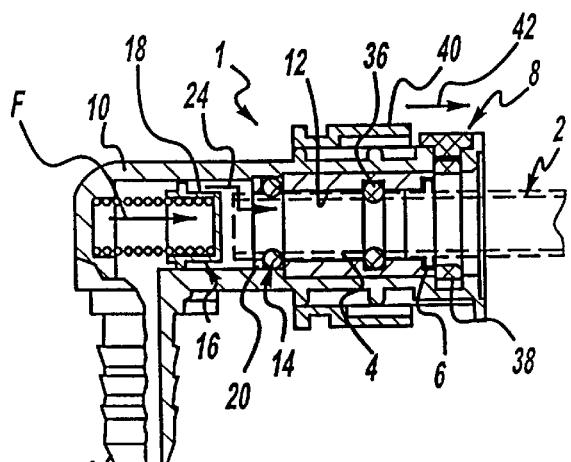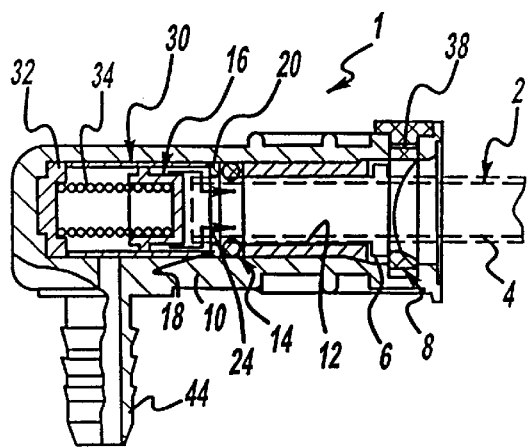
*Figure - 7*
*Figure - 8*
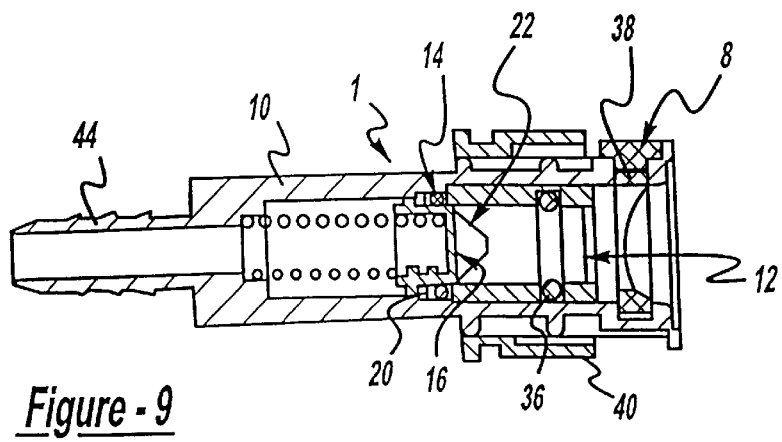
*Figure - 9*

PLUG-IN CONNECTION WITH LEAKAGE PROTECTION

This is a division of U.S. patent application No. 09/059,982, filed Apr. 14, 1998 now U.S. Pat. No. 6,089,540.

BACKGROUND AND SUMMARY OF THE INVENTION

The present invention concerns a plug-in connection for connecting a plug-in art, especially one formed by one end of a pipe line, which consists of a receiving ousing with a plug-in opening for the plug-in part, a circumferential seal for sealing a circular gap between the receiving housing and the inserted plug-in part as well as valve element, which when it is disconnected, closes automatically in order to provide run-out protection for the housing, and which valve element can be opened by means of inserting the plug-in part.

Such a plug-in connection is known from the EP 0 702 187 A1. This known "quick connect unit" represents a costly design because, on the one hand, the circumferential seal, which is provided for sealing the inserted plug-in part consists of two individual sealing rings, and on the other hand, the valve element is guided in a guide sleeve, which is sealed against the receiving housing by a first seal. The valve element itself, when it is in its closing position, can be sealed by means of a second seal against the guide bushing.

The DE 42 14 104 A1 describes a "leak-free plug-in connection", which consists of one coupling part and one plug-in part, which can be inserted into it. In each of them, in the connection part as well as in the plug-in part, one check valve is included. Each check valve has its own seal in order to seal it against the housing in the closed position, and the plug-in part is sealed by means of a separate circumferential seal against the connection part.

The present invention is based on the task of creating a plug-in connection of the generic type described at the beginning, which—due to its especially simple design configuration—is favorable with regard to cost.

In accordance to the invention, this is achieved in that the valve element, in order to close the receiving housing, acts directly together with the same circumferential seal, which is actually associated with the plug-in part. This means, that the circumferential seal—preferably formed by a single sealing ring—when the plug-in part is disconnected, is located directly in the circular gap between the receiving housing and the valve element, and when it is disconnected, it is located directly between the receiving housing and the plug-in part. As far as the design is concerned, this is accomplished in that the valve element includes a sealing region, which acts jointly with the circumferential seal, which sealing region, as far as its exterior circumferential contour is concerned, corresponds basically to the plug-in part. When the plug-in part is now inserted it can thus be guided through the circumferential seal, which causes the valve element to be moved at the same time away from this (only) circumferential seal.

According to the invention there is thus only a single circumferential seal still required, in order to, on the one hand, to ensure sealing between the inserted plug-in part and the receiving housing, and on the other hand, however, also sealing of the valve element in order to ensure run-out protection when it is disconnected. From this a very simple—and therefore advantageous regarding its price—construction method results.

Further advantageous design characteristics of the invention are shown in the following dependent claims as well as in the following description.

BRIEF DESCRIPTION OF THE DRAWINGS

On the basis of some preferred examples of embodiments, the invention will now be explained in more detail with reference to the drawing. The following is shown:

FIG. 5 is a further embodiment of the plug-in connection according to the invention, once again in the disconnected condition;

FIG. 6 is a front view of the valve element according to FIG. 5 in the direction of the arrow VI;

FIG. 7 is the plug-in connection according to FIG. 5 in the connected condition (analogous to FIG. 3);

FIG. 8 is a different version of the embodiment of the plug-in connection according to FIGS. 5 and 7 of the "cartridge method of construction"; and FIG. 9 is a further example of a different version of the embodiment of the plug-in connection according to FIGS. 5 and 7.

DETAILED DESCRIPTION OF THE PREFERRED EMBODIMENT

Figure 1:
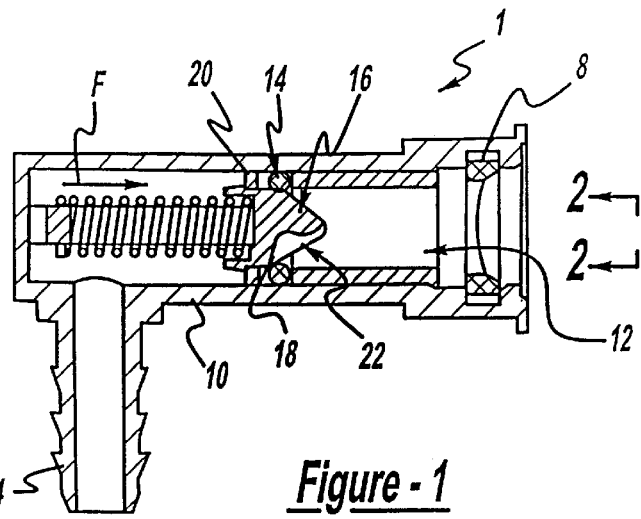
FIG. 1 is a longitudinal section of a plug-in connection according to the invention in a first embodiment without the presentation of the plug-in part, i.e. in the disconnected condition.
Figure 2:
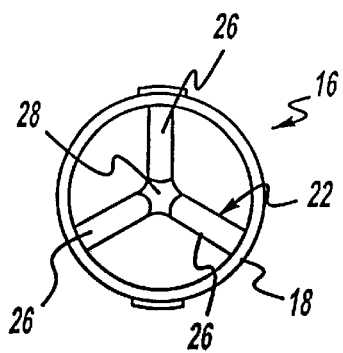
FIG. 2 is an enlarged front view of the valve element in the direction of the arrow II according to FIG. 1.

In the various figures of the drawing, equal parts are always given the same reference symbols and they are, therefore, as a rule described only once.

Figure 3:
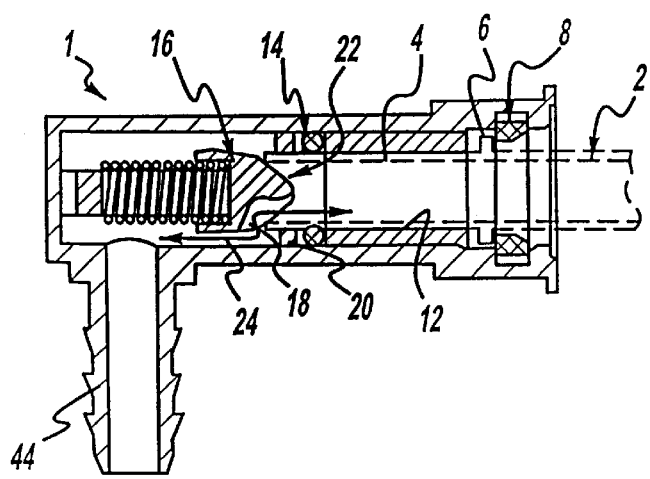
FIG. 3 is a presentation of the plug-in connection according to FIG. 1, while it is connected, (plug-in part shown with dotted line)

A plug-in connection 1 according to the invention has the purpose of creating a quick and separable connection of a plug-in part 2, which is shown by dotted lines only in each of the FIGS. 3, 7 and 8. The plug-in part 2 is, in particular, formed by an end of pipe line 4 and, for the purpose of interlocking it, it includes a circumferential circular bead 6 at its outer periphery, which acts jointly with a locking arrangement 8, which will be explained in greater detail below. The circular bead 6 can be generated in an advantageous manner with regard to its costs by means of upsetting the end of pipe 4.

The plug-in connection 1 forms a bushing and consists of a receiving housing 10 with a plug-in opening 12 for the plug-in part 2. Within the receiving housing 10 a circumferential seal 14 for sealing a circular gap between the receiving housing 10 and the inserted plug-in part 2 has been provided. Furthermore, within the receiving housing 10 a valve element 16 is located, which in the manner of a check valve, automatically shuts itself off when it has been disengaged, in order to provide run-out protection for the receiving housing 10, and which is opened by means of the plug-in part 2, when it is installed.

According to the invention it is now contemplated that—in order to close the receiving housing 10—the valve element 16 acts directly together with the same circumferential seal 14, which has been associated with the plug-in part 2. In this case, the circumferential seal 14 preferably consists of a simple O-ring, which is especially advantageous with respect to price. As can be seen from each of the FIGS. 1, 4, 5 as well as 9, the circumferential seal 14—when the plug-in part is disconnected—is disposed directly in the annular gap between the receiving housing 10 and the valve element 16. When it is connected—see FIGS. 3, 7 and 8 for comparison—the circumferential seal 14 is located directly between the receiving housing 10 and the plug-in part 2. For this purpose, the valve element 16 includes a sealing region 18 which acts jointly with the circumferential seal 14, which sealing region has an outer peripheral contour essentially corresponding to the plug-in part 2, and which in particular has the same outer diameter.

In the embodiments according to FIGS. 1–4 the sealing region 18 of the valve element 16 has a slightly conical form, while in the embodiments according to FIGS. 5 to 9 it is cylindrical.

The valve element 16 is—in accordance with the insertion direction of the plug-in part 2—guided in an axially movable manner, and at the same time it is thus subjected to a spring force F. In its closing position, which is occasioned by the spring force (see FIGS. 1 and 5 for comparison), the valve element 16—after it is sealed by means of the circumferential seal 14—is axially in contact with a final stop 20 in the receiving housing 10.

The valve element 16 includes a contact section 22 for making direct contact with the plug-in part 2 in such a manner, that in the case of a contact between the outlet opening of the plug-in part 2 and the contact section 22 at least one flow passage 24 is formed for the medium, which flows through the plug-in connection 1. As can be seen in particular from each of the FIGS. 2 and 6, the contact section 22 consists preferably of at least two, in the illustration three, essentially radial ridges 26, which together define an essentially conical enveloping surface with a tip 28, which is pointed toward the plug-in part 2. In this case, the contact section 22 has a maximum diameter, which is that much greater than the inner diameter of the outlet opening of the plug-in part 2, that the interior edge of the opening makes contact in the intermediate axial region of the contact section 22 on the obliquely extending outer edges of the ridge 26 (see FIGS. 3, 7 and 8). In this manner the flow passages 24 are always generated between the ridges 26 and the outlet opening of the plug-in valve 2.

Figure 4:
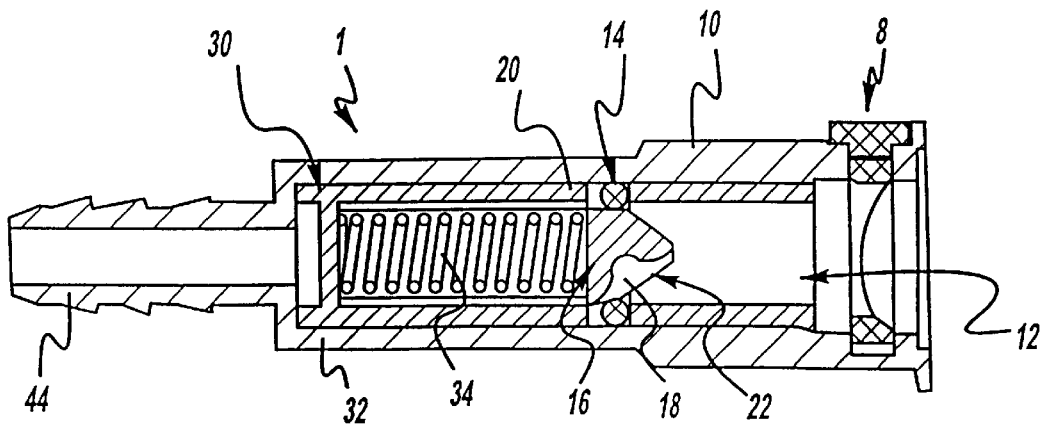
FIG. 4 is a different version of the embodiment of the plug-in connection of the so-called "cartridge type of construction"

As can be seen from both FIGS. 4 and 8, in a preferred embodiment of the invention it is contemplated, that the valve element 16 is a part of a pre-assembled valve cartridge 30. Thus, in this case, the "cartridge building technique", which is known as such, is involved. The valve cartridge 30 consists of an inner, sleeve-like insert housing 32 and the valve element 16, which is located inside it along with a spring element 34, which generates a spring force F acting in the direction of closing the valve. In this case, the final stop 20 is formed at the end of the insert housing 32, which points in the direction of closing it. This embodiment makes the assembly of the plug-in connection 1 according to the invention easier, in that the pre-assembled valve cartridge 30 merely needs to be installed in the receiving housing 10.

In the embodiments according to FIGS. 5, 7 and 9, as a further preferred design characteristic of the invention it is contemplated, that in the region between the circumferential seal 14 and the outlet side of the plug-in opening 12 a second sealing element 36 is disposed for sealing the annular gap between the receiving housing 10 and the plug-in part 2. This additional sealing element 36 serves, on the one hand, as a dust protection means, i.e. as a protection against the intrusion of dirt, moisture and other foreign bodies from the outside, and on the other hand, with this sealing element 36 an additional protection against leaks is also achieved, in that—in any event—it seals the plug-in connection 1 from the outside at least long enough until the valve element 16 actually closes the housing by acting jointly with the circumferential seal 14, when the plug-in part 2 is being removed, before the plug-in part 2 is completely taken out beyond the sealing element 36.

The locking device 8, which has already been mentioned further above, includes a retaining element 38, which can be deformed elastically in a radial direction, for the form-fitting engagement of a circular step or of the circular bead 6, respectively, of the plug-in part 2. The retaining element 38 is advantageously made as a clamping element or a ring element, respectively, which can be elastically spread apart. In this case, a protection against the possibility of an unwanted spreading, and thus against an unwanted release of the plug-in part 2, can be achieved in a manner, that is known as such, by means of a safety sleeve 40, which is placed on the receiving housing 10 in a manner allowing it to be moved back and forth. According to FIG. 7, the safety sleeve 40 is pushed in the direction of the arrow 42 across the region of the retaining element 38, by which means the protection against spreading is achieved.

On the side of the flow channel, which runs through the plug-in connection 1, which side is opposite to the plug-in opening 12, the receiving housing 10 includes a pipe union 44 for connecting it to a pipe line or a hose, which are not shown. Here, the pipe union 44 can be either oriented approximately perpendicularly to the axis of insertion (FIGS. 1, 3, 5, 7 and 8), or the pipe union 44 points into the plug-in opening corresponding to the plug-in direction in the direction opposite to the plug-in opening 12 (FIGS. 4 and 9). Above all for pipe lines, it is useful to give the pipe union 44 the form of a spike, which is hammered into position with the usual spike profile.

It is further especially advantageous, when in the connected and thus opened condition, the plug-in connection 1 is provided with an effective cross-section for the flow at every part of the flow path, which is at least about equal to the inner cross-sectional area of the plug-in part 2 or the pipe union 44, respectively. This means that a throttling of the flow-cross-section by the check valve or by the valve element 16 is largely avoided.

The invention is not limited to the examples of the embodiment shown, but it includes all embodiments, which act in the same manner within the spirit of the invention. Furthermore, the invention is thus also not limited to the combination of characteristics defined in claim 1, but it can also be defined by any arbitrary other combination of certain characteristics of all the individual characteristics disclosed in general. This means that in principle practically every individual characteristic of claim 1 can be omitted or be replaced by at least one individual characteristic, which was disclosed in another part of the application. In this regard the claim 1 is merely to be understood as a first attempt at the formulation for an invention.

What is claimed is:

1. A plug-in connection for connection with a plug-in part comprising a receiving housing with a plug-in opening for the plug-in part, a circumferential seal for sealing a circular gap between the receiving housing and the inserted plug-in part, a valve element, which, when the connection is disconnected, automatically closes the receiving housing in order to provide run-out protection, and the valve element, when the plug-in part is inserted into the housing, is opened by the plug-in part, the valve element closing the receiving housing by engaging the same circumferential seal as does the plug-in part in its inserted position whereby the valve element is part of a pre-assembled valve cartridge which comprises an inner insert housing, the valve element, located inside the insert housing, and a spring element, which generates a spring force acting on the valve element in the direction of closure.

* * * * *